(12) United States Patent
Sharma et al.

(10) Patent No.: US 6,296,344 B1
(45) Date of Patent: Oct. 2, 2001

(54) METHOD FOR REPLENISHING COATINGS ON PRINTHEAD NOZZLE PLATE

(75) Inventors: Ravi Sharma, Fairport; Zhihao Yang, Webster; Thomas L. Penner, Fairport, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/470,813

(22) Filed: Dec. 22, 1999

(51) Int. Cl.[7] .................................................... B41J 2/165
(52) U.S. Cl. .............................................. 347/45; 347/47
(58) Field of Search .................................. 347/28, 48, 47, 347/44, 20, 45; 510/170; 427/387

(56) References Cited

U.S. PATENT DOCUMENTS

| | | | |
|---|---|---|---|
| 4,643,948 | 2/1987 | Diaz et al. | 428/422 |
| 5,010,356 | * 4/1991 | Albinson | 347/45 |
| 5,121,134 | * 6/1992 | Albinson et al. | 347/45 |
| 5,136,310 | 8/1992 | Drews | 346/140 |
| 5,598,193 | 1/1997 | Halko et al. | 347/45 |
| 5,910,372 | * 6/1999 | Griffin et al. | 428/429 |
| 6,020,026 | * 2/2000 | Birch et al. | 427/287 |
| 6,074,040 | * 6/2000 | Usui et al. | 347/45 |
| 6,193,352 | * 2/2001 | Sharma et al. | 347/28 |

\* cited by examiner

*Primary Examiner*—N. Le
*Assistant Examiner*—Matthew T. Welker
(74) *Attorney, Agent, or Firm*—Harold E. Cole

(57) ABSTRACT

A method for replenishing fouled coatings on a nozzle plate for an ink jet printhead, the nozzle plate comprising the following layers in the order recited: i) a first monomolecular layer of an organic material having first and second functional groups, the first functional group of the first monomolecular layer being bound to the surface of the nozzle plate, and the second functional group of the first monomolecular layer being bound to a second monomolecular layer, and ii) the second monomolecular layer of an organic material having first and second functional groups, the first functional group of the second monomolecular layer being bound to the second functional group of the first monomolecular layer, and the second functional group of the second monomolecular layer being an anti-wetting group, the second monomolecular layer having been fouled; the method comprising A) unbinding the first functional group of the fouled second monomolecular layer so that it is no longer bound to the second functional group of the first monomolecular layer; B) removing the fouled second monomolecular layer; and C) reattaching a new, unfouled second monomolecular layer to the first monomolecular layer; the new, unfouled second monomolecular layer comprising an organic material having first and second functional groups, the first functional group of the second new, unfouled monomolecular layer being bound to the second functional group of the first monomolecular layer, and the second functional group of the new, unfouled second monomolecular layer being an anti-wetting group.

14 Claims, 1 Drawing Sheet

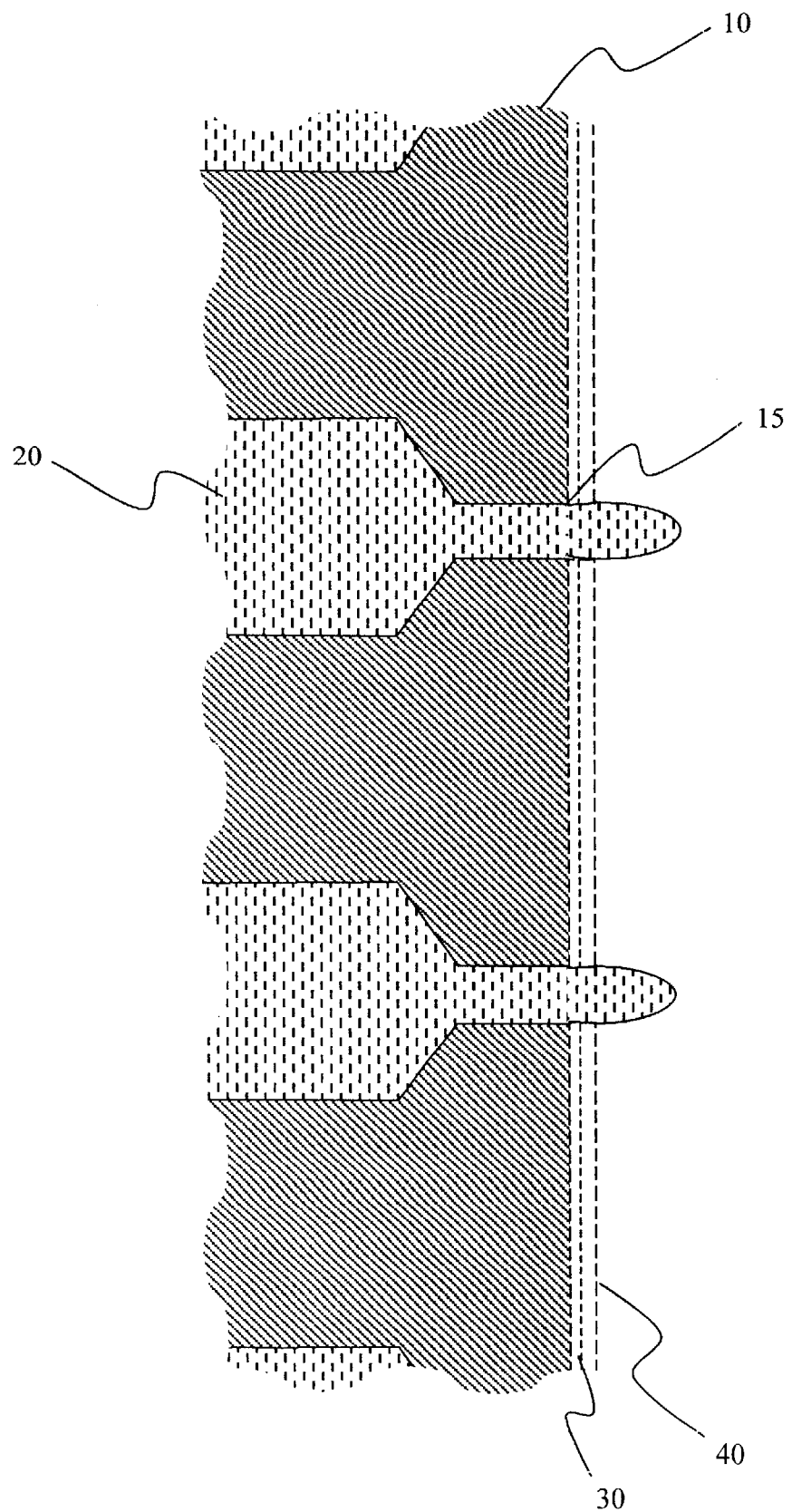

METHOD FOR REPLENISHING COATINGS ON PRINTHEAD NOZZLE PLATE

CROSS REFERENCE TO RELATED APPLICATIONS

Reference is made to copending U.S. patent application Ser. No. 09/470809 filed concurrently herewith, (Docket 79996HEC) entitled "Replenishable Coating For Printhead Nozzle Plate", by Yang et al., the teachings of which are incorporated herein by reference.

FIELD OF THE INVENTION

This invention relates to a method for replenishing coatings on a nozzle plate for an ink jet printhead containing monomolecular layers providing anti-wetting properties on the surface thereof.

BACKGROUND OF THE INVENTION

An ink jet printer produces images on a receiver by ejecting ink droplets onto the receiver in an imagewise fashion. The advantages of non-impact, low-noise, low energy use, and low cost operation in addition to the capability of the printer to print on plain paper are largely responsible for the wide acceptance of ink jet printers in the marketplace.

In this regard, "continuous" ink jet printers utilize electrostatic charging tunnels that are placed close to the point where ink droplets are being ejected in the form of a stream. The selected ones of the droplets are electrically charged by the charging tunnels. The charged droplets are deflected downstream by the presence of deflector plates that have a predetermined electric potential difference between them. A gutter may be used to intercept the charged droplets, while the uncharged droplets are free to strike the recording medium.

In the case of "on demand" ink jet printers, at every orifice a pressurization actuator is used to produce the ink jet droplet. In this regard, either one of two types of actuators may be used. These two types of actuators are heat actuators and piezoelectric actuators. With respect to heat actuators, a heater placed at a convenient location heats the ink and a quantity of the ink will phase change into a gaseous steam bubble and raise the internal ink pressure sufficiently for an ink droplet to be expelled to the recording medium. With respect to piezoelectric actuators, a piezoelectric material is used, which possesses piezoelectric properties such that an electric field is produced when a mechanical stress is applied. The converse also holds true: that is, an applied electric field will produce a mechanical stress in the material. Some naturally occurring materials possessing these characteristics are quartz and tourmaline. The most commonly produced piezoelectric ceramics are lead zirconate titanate, barium titanate, lead titanate, and lead metaniobate.

A continuing problem with ink jet printers is the accumulation of ink on ink jet nozzle plates, particularly around the orifice from which ink drops are ejected. The result of ink drops accumulating on the nozzle plate surface around the orifice is that it becomes wettable, causing ink drops to be misdirected, which degrades the quality of the printed image. To limit or prevent the spreading of ink from the orifice to the nozzle plate, it is common practice to coat the ink jet nozzle plate with an anti-wetting layer. Examples of anti-wetting layers are coatings of hydrophobic polymer materials such as Teflon® OR and polyimide-siloxane, or a monomolecular layer (self-assembled monolayer) of a material that chemically binds to the nozzle plate.

An ink jet nozzle plate can also be contaminated by ink drops that land on it. These "satellite" ink drops are created as a by-product of the separation process of the primary ink drop that is used in printing. Another source of contamination is caused when the primary ink drop impacts the recording material and splashes back to the nozzle plate. Where the whole nozzle plate surface has been treated with a non-wetting layer, such additional ink drops will bead-up for easy removal.

Ink drops accumulating on nozzle plates can also potentially attract dirt such as paper fibers which causes the nozzles to become blocked. Partially or completely blocked nozzles can lead to missing or misdirected drops on the recording material, either of which degrades the quality of the print.

In order to solve this problem, the nozzle plates have to be periodically cleaned. This cleaning is commonly accomplished by brushing, wiping, spraying, vacuum suction, and/or spitting of ink through the orifices. A wet wiping technique utilizing inks and ink solvents used to dilute inks can be used. Even with the presence of hydrophobic non-wetting surfaces, inks often contain various materials which may leave an undesirable residue on the ink jet printhead nozzle plate. Thus, while wiping removes ink drops from the nozzle plate, the hydrophobic non-wetting coating may be severely contaminated by ink residue. Such resulting ink-fouled coatings may subsequently be unable to effectively prevent the spreading of ink from the orifices. In addition, some mechanical cleaning processes often damage the coatings, thus causing permanent printing failure of printhead operation.

U.S. Pat. Nos. 4,643,948; 5,136,310; and 5,598,193 relate to using self-assembled monolayers of alkyl thiols, alkyl trichlorosilanes and partially fluorinated alkyl silanes on nozzle plates for an ink jet printhead. However, there is a problem with these coatings in that they have a short life and they are often found to be easily fouled by ink.

It is an object of this invention to provide a method for replenishing a coating a nozzle plate for an ink jet printhead. It is another object of this invention to provide a method for replenishing a coating a nozzle plate for an ink jet printhead wherein an anti-wetting agent is bound to a nozzle plate by electrostatic attraction.

SUMMARY OF THE INVENTION

These and other objects are achieved in accordance with this invention comprising a method for replenishing fouled coatings on a nozzle plate for an ink jet printhead, the nozzle plate comprising the following layers in the order recited:

i) a first monomolecular layer of an organic material having first and second functional groups, the first functional group of the first monomolecular layer being bound to the surface of the nozzle plate, and the second functional group of the first monomolecular layer being bound to a second monomolecular layer, and ii) the second monomolecular layer of an organic material having first and second functional groups, the first functional group of the second monomolecular layer being bound to the second functional group of the first monomolecular layer, and the second functional group of the second monomolecular layer being an anti-wetting group, the second monomolecular layer having been fouled; the method comprising A) unbinding the first functional group of the fouled second monomolecular layer so that it is no longer bound to the second functional group of the first monomolecular layer;

B) removing the fouled second monomolecular layer; and

C) reattaching a new, unfouled second monomolecular layer to the first monomolecular layer, the new, unfouled second monomolecular layer comprising an organic material having first and second functional groups, the first functional group of the second new, unfouled monomolecular layer being bound to the second functional group of the first monomolecular layer, and the second functional group of the new, unfouled second monomolecular layer being an anti-wetting group.

The invention provides a method for replenishing coatings on a nozzle plate for an ink jet printhead which can be easily accomplished.

BRIEF DESCRIPTION OF DRAWING

The drawing illustrates a cross section of a nozzle plate 10, for an ink jet printhead. The nozzle plate has a number of orifices, 15, through which ink 20 is ejected onto a recording element, not shown. Layer 30 on nozzle plate 10 is the first monomolecular layer having, for example, the formula Z—L$_n$—X, described below. Layer 40 on top of layer 30 is the second monomolecular layer having, for example, the formula Y—R, described below.

DETAILED DESCRIPTION OF THE PREFERRED EMBODIMENTS

In a preferred embodiment of the invention, the first monomolecular layer on the nozzle plate used in the method of the invention has the formula:

Z—L$_n$—X wherein:

Z represents the first functional group of the first monomolecular layer which is bound to the surface of the nozzle plate;

L represents a linking group of 1 to 30 carbon atoms;

X represents the second functional group of the first monomolecular layer comprising a cationic group, such as a quaternary ammonium group, e.g., a trimethylamino group, (CH$_3$)$_3$N—, or an anionic group such as a carboxylate, phenoxy or sulfonate group; and n is either 0 or 1.

The nozzle plate surface may be formed of a metal, metal oxide or metal nitride which would react with the first functional group of the first monomolecular layer. In another preferred embodiment of the invention, the nozzle plate is silicon which may have a native oxide coating thereon merely by being exposed to air.

In still another preferred embodiment, the nozzle plate surface may be formed of silicon oxide or silicon nitride and Z in the above formula represents SiQ$_m$ wherein:

each Q independently represents halogen or an alkoxy group having from 1 to about 3 carbon atoms; and m is an integer from 1 to 3.

An example of Z is trichlorosilyl (Cl$_3$Si—) or trialkoxylsilyl groups, which form the siloxane (—Si—O—Si—) linkage with the silicon, silicon oxide or silicon nitride of the nozzle surface. Another example of Z is a thiol group that would react with a metal such as a gold, silver, copper, platinum or palladium surface of a nozzle plate.

In yet another preferred embodiment of the invention, the second monomolecular layer on the nozzle plate used in the method of the invention has the formula:

Y—R wherein:

Y represents the first functional group of the second monomolecular layer comprising an anionic group having a charge opposite to that of X, such as a carboxylate, phenoxy or sulfonate group, or a cationic group having a charge opposite to that of X, such as a quaternary ammonium group; and R represents an anti-wetting group, such as a substituted or unsubstituted alkyl, aryl, fluoroalkyl or arylfluoroalkyl group having from about 2 to about 30 carbon atoms.

If the first monomolecular layer has the formula Z—L$_n$—X, where Z is the first functional group which is bound to the surface of the nozzle plate, and X is the second functional group which is bound to the first functional group of the second monomolecular layer, and the second monomolecular layer has the formula Y—R, where Y is the first functional group of the second monomolecular layer which is bound to the second functional group of the first monomolecular layer, and R is the second functional group of the second monomolecular layer which is an anti-wetting group, these functional groups will be aligned as follows:

Nozzle Plate . . . Z—L$_n$—X . . . Y—R (Anti-wetting group)

Although not preferred, it is possible to incorporate additional layers between the two monomeric layers, in which case the functional groups of these two monomeric layers will be indirectly attached to each other, rather than being directly attached as described above.

In the context of this invention, a fouled nozzle plate coating means damage such as portions of the coating having being lost caused by repeated wiping of the surface or deterioration of the coating, such as that caused by chemical contamination such as unwanted ink deposits, dirt, paper fibers, etc.

When the second monomolecular layer coating containing the anti-wetting group is contaminated by ink and normal cleaning fails to clean the printhead, the contaminated coatings can be removed by selectively removing or destroying the bond between the two monomolecular layers. For example, this bond can be removed by heating, hydrolysis, photo-degradation, radiation, ultrasound or pH adjustment.

In a preferred embodiment, by simply changing the pH of the cleaning solution which is used to clean the print head, the bond between the two monomolecular layers can be broken. For example, when the second functional group of the first monomolecular layer is a quartenary ammonium group and the first functional group of the second monomolecular layer is a carboxylate group, lowering the pH protonates the carboxylate group to form a neutral carboxylic acid group which can no longer have an electrostatic attraction to the quartenary ammonium group. If the cleaning solvent is isopropanol, then lowering the pH from about 3 to about 1 causes the protonation.

When the bond between the two monomolecular layers is broken, then the anti-wetting group is removed from the surface of the nozzle plate. To replenish the anti-wetting coating, the anti-wetting agent is added to the cleaning solution at a higher pH and applied to the nozzle plate. For example, if the anti-wetting agent is a fluorinated carboxylic acid in an isopropanol cleaning solution, raising the pH to about 3 causes the anti-wetting agent to bind to the positively-charged first monomolecular layer of the nozzle plate which remains bound to the nozzle plate. The anti-wetting layer coating is thus replenished by this step.

The two monomolecular layers may be bound together by a variety of chemical bonds such as, covalent bonding, electrostatic bonding, hydrogen bonding, van der Waals bonding, hydrophobic bonding, coordination bonding, pi bonding, etc. In a preferred embodiment of the invention, the first functional group of the second monomolecular layer is electrostatically bound to the second functional group of the first monomolecular layer. In this embodiment, the monomolecular layers comprise a layer of material formed by a charged compound which directly bonds to the nozzle plate surface by a chemical reaction, and a second layer of anti-wetting agent which has an opposite charge to the first layer, is electrostatically adsorbed to the first layer. In another embodiment, the first monomolecular layer may be bound to the nozzle plate surface by electrostatic attraction.

In another preferred embodiment of the invention, the first monomolecular layer is a quaternary ammonium compound and the second monomolecular layer comprises a carboxylate compound having a carboxylate group and an anti-wetting group. When the carboxylate compound has been fouled, the unbinding step A) is accomplished by lowering the pH to protonate the carboxylate group, thus creating an uncharged carboxylic acid group which can no longer be bound to the quaternary ammonium compound. The fouled carboxylate compound can then be removed by a solvent wash. Following that step, step C) of reattaching a new, unfouled carboxylate compound to the quaternary ammonium compound is accomplished by contacting the nozzle plate with a solution of the carboxylate compound at a pH sufficient to maintain ionization of the carboxylate group, so that the unfouled carboxylate compound will be reattached to the quaternary ammonium compound.

When the nozzle plate has been damaged by only a portion of the second monomolecular layer having been unbound from the first monomolecular layer during printing or printhead cleaning, step C) can be accomplished by contacting the nozzle plate with a solution of the anti-wetting agent. Preferably the solution of the anti-wetting agent is contained in an ink. This charged anti-wetting agent thus repairs the layers in situ.

A nozzle plate for a conventional ink jet printhead preferably comprises silicon having an array of orifices through which ink is ejected. The orifices may be prepared by conventional etching techniques. The nozzle plate may also have a metallic oxide or nitride coating. It should be appreciated that other materials besides silicon, such as electro-formed nickel or polyimide, may be used to prepare the underlying nozzle plate as is known in the art. Further, other metals such as gold, silver, palladium and copper may be used to coat the underlying nozzle plate material.

The wetting character of surface of the ink jet nozzle plate is conventionally defined by the size of the contact angle between an ink drop and the test surface. Contact angles are conventionally measured by placing a 1–2 mm diameter liquid drop on a test surface and measuring the angle between the liquid and solid using a contact angle goniometer. A surface is considered anti-wetting if the contact angle between the ink and the surface is approximately 70° or greater.

The following examples illustrate the utility of the present invention.

EXAMPLE 1

Preparation of Monomolecular Layers

A silicon wafer as the nozzle plate material was coated with an anti-wetting coating in the following manner: The wafer surface was first treated and cleaned under an oxygen plasma. Then, it was placed in an 1% solution of N-trimethoxysilylpropyl-N,N,N-trimethylammonium chloride (TMA) in chloroform and kept for 12 hrs before being removed and rinsed with chloroform. The water contact angle on the surface was about 4°.

The wafer was then dipped into a 0.5% solution of perfluoroundacanoic acid (FUA) in isopropyl alcohol (IPA) for 2 minutes. Several drops of diluted NaOH in IPA solution were added to keep the dipping solution pH~3. The surface was rinsed with IPA and dried under a nitrogen stream. The water contact angle on the surface is 90±6°.

EXAMPLE 2

Removal and Replenishment of the Anti-wetting Coating

An FUA/TMA coated wafer, as prepared in Example 1, was placed in an IPA solution with pH~1, adjusted by diluted HCl and NaOH. The wafer was removed from the solution and dried for 1 minute, and the water contact angle on the wafer surface was 20°, which indicates that most of the anti-wetting layer of FUA had been removed. The wafer was then dipped into the FUA/IPA solution with pH3 for 2 minutes. After rinsing with IPA and drying under a nitrogen stream, the wafer was found to have a water contact angle of 92°, as shown in Table 1.

TABLE 1

|  | Initial FUA/TMA coated surface | After removal of FUA layers | After FUA coating replenishment |
|---|---|---|---|
| Water Contact Angle on Wafer Surfaces | 93° | 20° | 92° |

The above results show that the anti-wetting coating can be removed and replenished, i.e., the contact angle is shown to be reduced to 20° indicating removal of the anti-wetting coating, and restored to 92 ° after replenishment.

EXAMPLE 3

Ink-fouling and Surface Recovery

The FUA/TMA coated wafers, as prepared in Example 1, were dipped in NovaJet® Cyan, Magenta, Yellow and Black inks (Lyson, Inc.) for 5–10 minutes. After rinsing the surfaces with water, the contact angles of water on the surfaces were measured, indicating different degrees of ink-fouling or ink-contamination on the surfaces. The wafers were then soaked in an IPA solution with pH~1 to remove FUA coatings, and recoated with a fresh layer of FUA by dipping the wafers in the FUA/IPA solution with pH~3. The following results were obtained:

TABLE 2

| Inks | NovaJet ® Cyan | NovaJet ® Magenta | NovaJet ® Yellow | NovaJet ® Black |
|---|---|---|---|---|
| Initial Contact Angle with Water | 85° | 85° | 85° | 85° |
| Contact Angle with Water after soaking in inks | 65° | 58° | 75° | 49° |

TABLE 2-continued

| Inks | NovaJet® Cyan | NovaJet® Magenta | NovaJet® Yellow | NovaJet® Black |
|---|---|---|---|---|
| Contact Angle with Water after FUA removal | 34° | 38° | 38° | 28° |
| Contact Angle with Water after FUA coating replenishment | 80° | 81° | 82° | 80° |

The above results show that the water contact angle on the nozzle plate decreases when soaked in the ink, indicating that the surface had been fouled by the ink. The contaminated coating was substantially removed, as evidenced by the decrease in water contact angle on the third row of data. The fourth row of data indicates that the coating has been replenished since the water contact angle has been restored to near its original value as stated in the first row.

Although the invention has been described in detail with reference to certain preferred embodiments for the purpose of illustration, it is to be understood that variations and modifications can be made by those skilled in the art without departing from the spirit and scope of the invention.

What is claimed is:

1. A method for replenishing fouled coatings on a nozzle plate for an ink jet printhead, said nozzle plate comprising the following layers in the order recited:

i) a first monomolecular layer of an organic material having first and second functional groups, said first functional group of said first monomolecular layer being bound to the surface of said nozzle plate, and said second functional group of said first monomolecular layer being bound to a second monomolecular layer, and ii) said second monomolecular layer of an organic material having first and second functional groups, said first functional group of said second monomolecular layer being bound to said second functional group of said first monomolecular layer, and said second functional group of said second monomolecular layer being an anti-wetting group, said second monomolecular layer having been fouled; said method comprising A) unbinding said first functional group of said fouled second monomolecular layer so that it is no longer bound to said second functional group of said first monomolecular layer;

B) removing said fouled second monomolecular layer; and

C) reattaching a new, unfouled second monomolecular layer to said first monomolecular layer, said new, unfouled second monomolecular layer comprising an organic material having first and second functional groups, said first functional group of said second new, unfouled monomolecular layer being bound to said second functional group of said first monomolecular layer, and said second functional group of said new, unfouled second monomolecular layer being an anti-wetting group.

2. The method of claim 1 wherein said first monomolecular layer is a quaternary ammonium compound and said second monomolecular layer comprises a carboxylate compound having a carboxylate group and an anti-wetting group.

3. The method of claim 2 wherein the unbinding step A) is accomplished by lowering the pH to protonate said carboxylate group, thus creating an uncharged carboxylic acid group which can no longer be bound to said quaternary ammonium compound.

4. The method of claim 3 wherein said fouled carboxylate compound is removed by a solvent wash.

5. The method of claim 4 wherein said step C) of reattaching a new, unfouled carboxylate compound to said quaternary ammonium compound is accomplished by contacting said nozzle plate with a solution of said carboxylate compound at a pH sufficient to maintain ionization of said carboxylate group, so that said unfouled carboxylate compound will be reattached to said quaternary ammonium compound.

6. The method of claim 1 wherein said first functional group of said second monomolecular layer is electrostatically bound to said second functional group of said first monomolecular layer.

7. The method of claim 1 wherein said surface of said nozzle plate is silicon oxide or silicon nitride and said first monomolecular layer has the formula:

$$Z-L_n-X$$

wherein:

Z represents said first functional group of said first monomolecular layer which is bound to the surface of said nozzle plate;

L represents a linking group of 1 to 30 carbon atoms;

X represents said second functional group of said first monomolecular layer comprising an anionic or cationic group; and n is either 0 or 1.

8. The method of claim 7 wherein X is a quaternary ammonium group.

9. The method of claim 7 wherein Z is $$SiQ_m$$

wherein:

each Q independently represents halogen or an alkoxy group having from 1 to about 3 carbon atoms; and m is an integer from 1 to 3.

10. The method of claim 7 wherein said second monomolecular layer has the formula:

$$Y-R$$

wherein:

Y represents said first functional group of said second monomolecular layer comprising an anionic group having a charge opposite to that of X or a cationic group having a charge opposite to that of X; and R represents said anti-wetting group.

11. The method of claim 10 wherein R comprises a substituted or unsubstituted alkyl, aryl, fluoroalkyl or arylfluoroalkyl group having from about 2 to about 30 carbon atoms.

12. The method of claim 10 wherein Y is a carboxylate group.

13. The method of claim 1 wherein said nozzle plate has been damaged by only a portion of said second monomolecular layer having been unbound from said first monomolecular layer and said step C) is accomplished by contacting said nozzle plate with a solution of said anti-wetting agent.

14. The method of claim 13 wherein said solution of said anti-wetting agent is contained in an ink so that the replenishment of said second monomolecular layer takes place in situ.

* * * * *